Patented Oct. 5, 1937

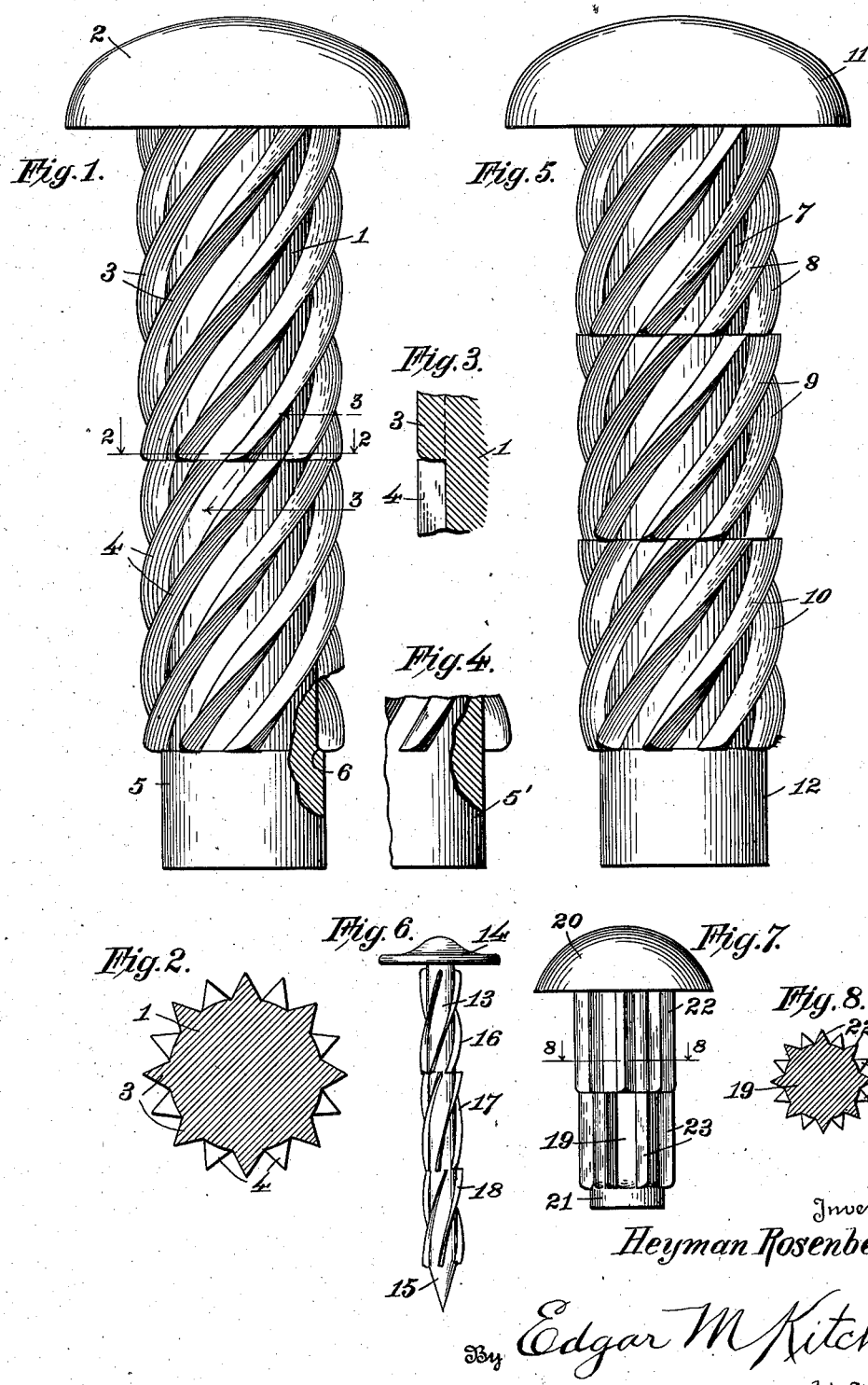

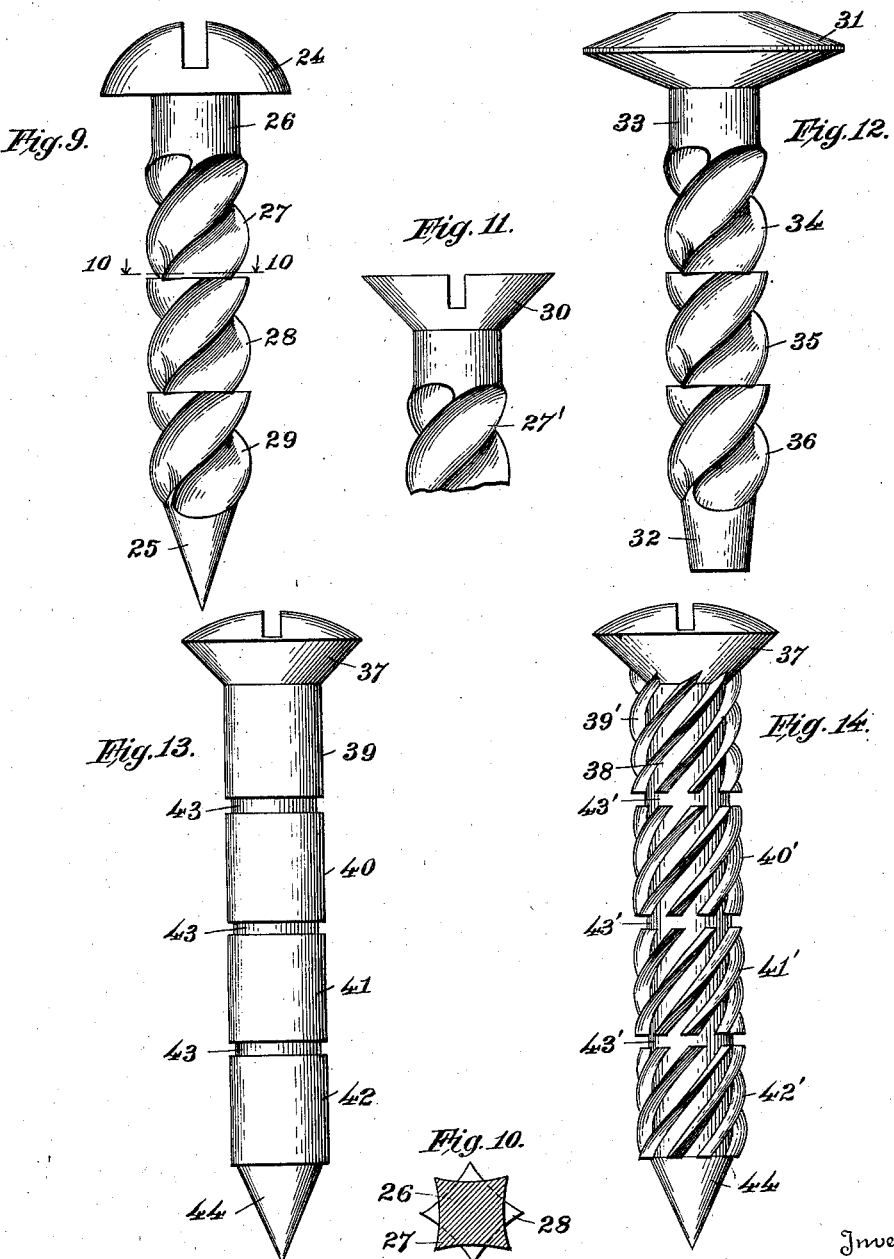

2,095,153

UNITED STATES PATENT OFFICE 2,095,153

FASTENER

Heyman Rosenberg, New York, N. Y.

Application January 25, 1934, Serial No. 708,295

5 Claims. (Cl. 85—20)

In my United States Letters Patent No. 1,482,151, dated January 29, 1924; No. 1,485,202, dated February 26, 1924; No. 1,545,471, dated July 7, 1925, and No. 1,686,468, dated October 2, 1928, there are disclosed forms of fasteners having hardened threads and adapted to be hammer-driven to effective anchorage in solid bodies of the harder metals, such as soft iron and soft steel, and the resistance to withdrawal stresses of these several fasteners has proved to be very great, and the form adapted for the widest range of use while affording the greatest resistance to withdrawal is seen in my Patent No. 1,545,471.

The present invention relates to improvements in this class of fasteners, in the manufacture of which the expense of production is materially reduced and the efficiency increased.

In my co-pending applications Serial Nos. 674,086 and 674,087, filed June 2, 1933, as divisions of my co-pending application Serial No. 651,783, filed January 14, 1933, it is pointed out that difficulty was previously experienced in producing the fastener of my Patent No. 1,545,471, because of the difficulty of successfully producing dies capable of rolling the fastener. By virtue of the inventions of said co-pending applications, it is now practicable to produce the fastener of my said Patent No. 1,545,471 for sale at a not prohibitive cost, but nevertheless the cost of production is substantially greater than that of producing fasteners of my Patents Nos. 1,482,151; 1,485,202, and 1,686,468.

It is an important object of the present invention to obtain substantially the anchorage capacity in a fastener as that provided by the fastener of my Patent No. 1,545,471 at a materially reduced cost of production of the fastener, and, in fact, in some materials the anchorage of the present improved fastener is superior to that of the fastener of my Patent No. 1,545,471.

Other objects in view will become obvious in part and in part be stated hereinafter.

The invention includes a fastener having a plurality of sections of ribs arranged consecutively in the length of the body of the fastener and offset angularly relative to each other about the body of the fastener.

The invention also includes such a fastener wherein the spacing of the ribs and the bases of the ribs are such that the base of one rib of one section substantially spans the space between the adjacent base lines of an adjacent section.

The invention also comprises certain other novel constructions, combinations, and arrangements of parts of a fastener as will hereinafter be specified and claimed.

In the accompanying drawings,—

Figure 1 is a view in side elevation of a fastener embodying the features of the present invention, and made in accordance with the art thereof, a part being broken away to disclose the pilot overhang.

Figure 2 is a cross section taken approximately on the plane indicated by line 2—2 of Figure 1, and looking downward.

Figure 3 is a fragmentary section taken on the plane indicated by line 3—3 of Figure 1.

Figure 4 is a fragmentary, sectional elevation of a slight modification of the structure seen in Figure 1 wherein the pilot overhang is not present.

Figure 5 is a view similar to Figure 1 of a further embodiment wherein three distinctive rib sections are employed instead of two.

Figure 6 is a view similar to Figure 1 of an embodiment of the invention particularly well adapted for use in lieu of nails, such as in the fastening of sheet metal to wood.

Figure 7 is a further modified embodiment of the invention as seen in Figure 1 wherein the ribs are shown straight or parallel to the axis.

Figure 8 is a cross section taken on a plane indicated by line 8—8 of Figure 7, and looking downward.

Figure 9 is a view similar to Figure 1 of a further embodiment of the invention especially well adapted for use in wood and the like.

Figure 10 is a transverse section taken approximately on the plane indicated by line 10—10 of Figure 9, and looking downward.

Figure 11 is a fragmentary, side elevation of an embodiment similar to that seen in Figure 9, except for a difference in head contour.

Figure 12 is a view similar to Figure 1 of a further embodiment adapted particularly for use as a railway spike.

Figure 13 is a view in side elevation of a blank shaped to cause spacing of the several thread sections or areas.

Figure 14 is a view similar to Figure 13 of the completed fastener formed from the blank of Figure 13.

It should be understood that all of the figures of the drawings, except Figure 12, are magnified more or less from the popular sizes for commercial use, though sizes ranging from one-sixty-fourth of an inch in diameter and three-sixty-fourths of an inch long, over all, to seven-eighths of an inch in diameter and four and onehalf inches long, overall, have been manufactured, with further variations below and above these limits readily available when and if the demand occurs. The relatively enlarged showing facilitates disclosure of detail. Figure 12 is shown on a slightly reduced scale from the sizes popularly used.

The fastener shown in Figure 1 corresponds substantially to the embodiment illustrated in my Patent No. 1,482,151 with the present invention incorporated. The embodiment of Figure 1 thus consists essentially of a pin-like body 1 having a head 2 and spiral ribs arranged in two series or sections, one indicated by the numeral 3, and the other by the numeral 4. These spiral ribs are, in fact, threads as shown in this embodiment, but may be in the form of plain, straight ribs parallel to the axis of the pin, as hereinafter described with respect to Figures 7 and 8 of the drawings. The inner or entering terminal portion of the pin 1 is preferably provided with a pilot 5 having at its outer terminus a cylindrical shoulder or overhang 6, both the pilot and shoulder overhang being substantially the same as that disclosed in my last above mentioned patent. The pilot overhang or shoulder 6 may be omitted if desired with the result that a pilot 5', as seen in Figure 4, is provided of the same diameter as the body 1, so that the pilot 5' becomes a smooth extension of the root diameter of the pin or body 1. Also, it should be understood that the present improved fastener may be constructed without a pilot or extension beyond the lower terminus of the ribs 4.

The ribs or threads 3 and 4 may have any of various available pitch, but should be of sufficiently high pitch to enable the fastener to be hammer-driven into the harder metals, such as soft iron and soft steel, and into other like materials under such conditions that the entering ends of said threads or ribs enter the material and cause the material to flow laterally and down into the valleys between the ribs and thus produce clogging action by the flowed and compressed material of the work between the ribs, which material arches across the space between contiguous faces of ribs and thus braces itself and occasions a maximum frictional resistance to withdrawal movement. Each of these arches or clogs between each two ribs extends for as much of the length of the ribs as has been driven into the work, and while it is possible with the softer metals to cause the flowed material to seat against the body 1, with the harder materials it is not usually the practice to so proportion the fastener and the bore in the work as to cause that result, because of the excessive resistance to the entry of the fastener where the bore in the work is made sufficiently small to enable the iron or steel to actually flow to a condition completely filling the spaces between ribs and engaging the bases of the valleys. The extent to which the material will flow depends entirely on the relative diameter of the bore in the work provided to receive the fastener. Usually the bore is made to approximately fit and receive the pilot 5 in a manner to be easily manually removable, so that in operation the pilot may be inserted into the bore and the fastener will upstand from the work, being held alined by the engagement of the pilot 5 with the surrounding walls of the bore in the work. When the pilot 5' is used, the fit is usually not as snug unless the material to be entered is sufficiently soft and compressible to be caused to completely clog the spaces between ribs and to sufficiently compress under the action of the ribs in entering the work as to accommodate the ribs therein. A great latitude of variation is, of course, necessary in different conditions and different character of material in which the fastener is to be driven, but with the harder metals, such as soft iron and soft steel, a bore in the work is usually prepared equal approximately to and sufficiently larger than the diameter of the pilot 5 to facilitate ready, manual application of the pilot in the bore, and to allow the pilot to touch the walls of the bore so as to hold the fastener in place without manual aid while the fastener is being struck by a hammer.

For use in the harder metals, the ribs or threads 3 and 4 are hardened sufficiently to enter such metals substantially without injury to the ribs or threads, that is to say, in common commercial practice the ribs or threads of the fastener of my Patent No. 1,482,151 have been hardened by case-hardening the fastener, preferably by the cyaniding process, and the ribs or threads 3 and 4 of the instant invention are preferably likewise hardened.

The fastener 1 may be considered as having two sections or areas, though the two are integral and comprise one continuous structure, one of the sections being indicated by the group of ribs 4, and this section may be considered the inner or first entering section, while the group of ribs 3 may be considered the outer section looked upon from the approach of the fastener into the work. The ribs 4 of the inner section are located about the body 1 and spaced apart such that the spacing between contiguous ribs is preferably approximately equal to the width of the base of any particular rib, as plainly seen in Figure 2, and the spacing of the ribs 3 is preferably the same as the spacing of the ribs 4; but the ribs 4 are located with their outer ends angularly out of line with the ribs 3 and preferably in line with the bases of the valleys between the ribs 3, so that, since the distance from one edge of the base of a rib to the other edge of such base is substantially equal to the spacing between ribs, the base of the outer end of each of the ribs 4 substantially spans the space corresponding to the space between contiguous ribs 3. Thus, the outer ends of the ribs 4 present abrupt projections or interlocking means outstanding from the body 1 in line with and at the inner ends of the valleys between the several ribs 3.

Hence, in operation, when the fastener is driven into work substantially as taught by my Patent No. 1,482,151, that is, by inserting the pilot 5 into a bore in soft iron or soft steel, or other appropriate work, of less diameter than a circle touching the outer edges of the ribs 4, and the head 2 is struck by a hammer or otherwise subjected to sufficient longitudinal, axial stress as to cause the fastener to enter the work, the ribs 4 enter the iron or steel or other work endwise and groove their own paths in the work, so that the metal which is parted by the ribs is flowed along the sides of the ribs into the valleys between them and produces a clogging action. Between the adjacent faces of each two of the ribs 4 an arch of flowed material of the work is produced under such stress that a reaction within the metal itself is set up incident to the natural tendency of the flowed and arched metal to return to its initial state or condition, which reaction causes a powerful frictional and binding effect on the ribs. This force, of course, must be overcome by the hammer blows until the fastener is sufficiently or satisfactorily seated, whether entirely or only partially inserted. As the fastener progresses inward in the work and the inner ends of the ribs 3 begin to enter the material of the work not only is the wall of the bore entered, but the material previously flowed by ribs 4 is further caused to move or cold flow to a new and arched position between the ribs 3, and the material is also caused to become more compact incident to movement of the inner ends of ribs 3 into the material. The material is also caused to flow across portions of the outer ends of the ribs 4, and, where the crowding is sufficient, very substantial portions of the flowed material are caused to overhang and interlock with the outer ends of the ribs 4, so that any effort to withdraw the fastener after its insertion must be exerted against the resistance of the outer ends of ribs 4 against the thus flowed and overhanging material, as well as against the clogging between ribs.

It should be obvious that the interlocking action thus obtained by the material overhanging the rib ends adds to the capacity of the fastener to resist withdrawal no matter what the material may be of which the work is formed so long as it has the capacity either to flow or to spring to a position overhanging the ends of the ribs 4. It should also be apparent that as many sections, such as 3 and 4, may be provided in the length of a fastener as may be desired, so that the number and places of the interlocking means may thus be increased.

In Figure 5 is shown a fastener similar to the fastener shown in Figure 1, and differing therefrom only in the provision of more than two sections or areas, so that more than one place of interlock is provided. In this embodiment, the pin body 7 is provided with a head 11 and a pilot 12, and is also provided with the several series or sections of ribs 8, 9, and 10. All ribs 8, 9, and 10 are similar in geometric contour and relative spacing with respect to each other, and also similar in relative location in outstanding from the body 7; but the ribs of series or sections 9 are angularly advanced about the body 7 with their upper ends out of line with the ribs 8 so as to be in line with the valleys between ribs 8, and the ribs 10 are similarly located angularly of the body 7 with respect to ribs 9 so as to have their outer ends aline with the valleys between the ribs 9, all after the manner set forth with respect to fastener 1 except that a third series or set of ribs (10) is utilized so as to give a second set of interlocking means in the length of the fastener. Each of the ribs 3, 4, 8, 9, and 10 is preferably of the V type of cross section, but may be otherwise shaped, and each is shown as a thread having a sufficiently high pitch to lend itself to being driven into work, such as soft iron and soft steel, while rotating the fastener incident to advance in the work; and, while it is preferable to have the ribs proportioned with respect to their valleys, as shown and described above, other proportions are, of course, readily available with resulting differences in degree of capacity according to the work entered. For instance, while as with respect to the ribs 3 and 4 and the ribs 8, 9, and 10, the bases of the inner ribs substantially occupy the spacing at the lower ends of the valleys of the outer ribs, as seen in Figure 6, the ribs may be more widely spaced or may be slightly narrower and thus provide greater clearance and afford a more ready flow of the flowed material at the place of the interlock or terminus of one series and beginning of another series of ribs. This latter arrangement is found valuable where the material is fibrous and springs rather than flows, as, for instance, where the fastener is to be used in wood, and there is, therefore, a reasonable assurance that a sprung condition of the wood fiber will cause overhanging of the outer ends of the inner series of ribs while sufficient space is left between the inner ends of the outer series and the outer ends of the inner series to reduce the extent of compression of material passing between the respective series of ribs so as to avoid pulverizing or completely crushing the fiber or otherwise injuring such other material as may be entered. The fastener as seen in Figure 5 is preferably case-hardened, especially where it is to be used in work of the harder metals.

In Figure 6 is illustrated an embodiment of the present invention especially designed for anchoring sheet metal to wood, or for other uses where nails have heretofore been used, but where it is desired to provide a much more effective anchorage than can be secured by a nail. The structure is substantially identical with that described relative to Figure 5, except that the spacing of the ribs or the relatively reduced width of the several ribs causes the valleys therebetween to enable the provision of a clearance between the outer ends of inner rib sections and inner ends of outer rib sections. Specifically, the structure seen in Figure 6 consists of a pin-like body 13 having a head 14, and preferably a conical or tapering entering end portion or tip 15. It should be understood that the entering portion, tip or pilot may be varied widely, or entirely omitted in any of the structures wherever not required or desired. Outstanding from the body 13 are the rib series 16, 17, and 18, similar in construction and arrangement with those seen in Figure 5, except for the clearance above mentioned. The operation of the fastener 13 is the same as the operation of the fasteners 1 and 7 when the fastener 13 is provided with hardened ribs and driven into work of the harder metals, and is somewhat similar in operation when either hardened or not hardened and driven into fibrous material, such as commonly used for electric insulation, or such as wood, except for the difference in action of the material in finding interlocking relation with respect to the outer ends of inner series of ribs or threads. It should be plain that the fastener 13 when used as a nail may have its ribs or threads 16, 17, and 18 of exactly the same proportions and same relative location as the ribs 8, 9, and 10 of the fastener 7.

In Figures 7 and 8 is illustrated a fastener made up of a body 19 having a head 20, and a pilot 21. Outstanding from the body 19 are ribs 22 and 23, making up two series similar to the series 3 and 4, except that the ribs 22 and 23 are perfectly straight and lie parallel to the longitudinal axis of the body 19 so that the body may be driven into work without any turning movement. The ribs are relatively proportioned and the inner series set with respect to the outer series similar to the ribs 3 and 4, so that the valleys between the ribs of the outer series 22 have their inner ends partially closed by the outer ends of the series of ribs 23. In Figure 7 there is an optical illusion incident to the perspective on which the lateral ribs are seen which cause the inner series to appear to outstand from the body a slightly less distance than the outer series, but, as seen in Figure 8, the ribs 23 actually outstand the same distance and are of the same geometric form and proportions as the ribs 22. Obviously, this form and these proportions may be substantially changed without departing from the spirit of the present invention or substantially detracting from the interlocking action and the effective anchorage occasioned by the angular adjustment of a series of ribs with respect to another series about the body 19.

In Figures 9 and 10 is shown an embodiment of the invention applied to a popular form of commercial, wood drive screw in which the parts are shown as arranged similarly to those seen in Figure 6, except that a thread of different shape and pitch is used. In this embodiment, 24 indicates the head and 25 the entering end portion or pilot, while 26 is the body which preferably has a smooth portion between the head and the first section or series of threads 27, which section is followed by the thread sections 28 and 29. Obviously, as many such thread sections may be provided as desired. The principle of application of the invention is the same in this embodiment as in the other embodiments above described, and the difference in appearance arises from the thread formation as plainly seen in Figure 10, which is produced with a continuous curve between each two threads to form the valley therebetween, so that a very substantial portion of each of the threads of section 28 outstands below or inward of and in line with the corresponding valley between the respective threads of section 27. Thus, an effective interlock is provided well adapted for cooperating with fibrous material which springs rather than flows to new positions.

In Figure 11 is seen a further embodiment of substantially the same form of fastener as shown in Figures 9 and 10 except that the head 30 is flat and of the conventional countersink type instead of the rounded form. The body formation and the threads, such as 27' of Figure 11, correspond with those shown in Figures 9 and 10.

In Figure 12 is seen an embodiment of the present invention designed and adapted for use as a railway spike. It is preferably applied by being hammer-driven into place in a cross tie after a bore has been formed in the cross tie to receive it of substantially the diameter of the body of the fastener, or possibly slightly less than that diameter, so that likelihood of splitting or other injury to the cross tie is avoided. This embodiment includes the head 31 and the entering tip or pilot 32, the latter being preferably in the form of a truncated cone, since it is designed to enter an already prepared opening. The fastener has its body 33 formed with threads 34, 35, and 36 corresponding to those described in connection with Figures 9 and 10, and operating substantially the same with assurance of effective interlock precluding loosening of the fastener after it has been seated in the cross tie. The head 31 may assume any of various shapes, but is preferably of the form shown in Figure 12, so that as the fastener revolves while it is being driven into place, an overhanging portion of the head will assuredly overlap the flange of the rail to be anchored.

It will be observed that, as seen in the several figures of the drawings preceding Figures 13 and 14, the outer ends of the threads or ribs of each inner series or section are located substantially in the same transverse plane of the fastener as the inner ends of the next outer series or section. Variation in this location is, of course, available, and it is entirely feasible to space the outer ends of an inner section or series of threads or ribs inward from the inner ends of the next adjacent outer section or series of threads or ribs. This is preferably accomplished by the employment of a special blank having the requisite circumferential grooves or depressions at the places where the spaces are to occur between the respective ends of adjacent thread sections or series. In Figures 13 and 14 is shown an embodiment expressing this application of the invention.

In Figure 13 is shown a prepared blank ready to be rolled, in which 37 indicates the head and 44 the pilot or entering tip, the body being seen in Figure 14 at 38. This body or root diameter is observable in Figure 13 only at the places between the several spaced series or sections of ribs or threads, the places where such ribs or threads are to appear having the larger diameters indicated at 39, 40, 41, and 42 which provide the necessary material out of which the ribs or threads are to be rolled. Between the areas of greater diameter, indicated at 39, 40, 41, and 42, are the circumferential grooves 43 where the root diameter or body of the fastener in its final dimensions is exposed. The formation of the ribs of the fastener 38 is accomplished the same as that of the various other fasteners above described, except that in the absence of material at the places 43 no thread or rib will appear in the course of the rolling operation. In the absence of material at the places 43, the presence or absence of die portions becomes immaterial, and the dies may be spaced apart if desired to correspond to spaces 43.

The resulting product from the rolling of the blank seen in Figure 13 is the fastener seen in Figure 14 with the thread or rib series or sections 39', 40', 41', and 42'. The structure seen in Figure 14, when used in the harder metals, such as soft iron and soft steel, is preferably case-hardened, or the threads or ribs are otherwise appropriately hardened to a condition adapting them to resist wear in entering such harder metals substantially without injury to the threads. Likewise, in all of the embodiments illustrated, the threads or ribs are preferably hardened to the same extent so as to possess the same characteristics where intended for use in the said harder metals, and it is preferable for commercial purposes to effect such hardening of the threads or ribs by the well known cyanide process of casehardening as a convenient, effective, and dependable mode of producing uniformly hardened threads.

In the commercial production of threaded and ribbed fasteners, perhaps the most popular mode of manufacturing to provide quantity production at minimum expense is by rolling in thread rolling machines, and it is, of course, well understood that when rolling a fastener such as shown in my Patent No. 1,482,151 the pilot and the pilot overhang are provided by the form of blank employed and the fact that the rolling operation effects less than the full length of the blank. Similarly, in practicing the present invention as an art of constructing fasteners, the pilot, whatever its form as seen throughout the drawings, results from the excess portion of the blank and the blank being given such diameter at such excess portion as to afford the result intended, so that, so far as the rolling operation is concerned, the pilot may be disregarded, and, in fact, it is entirely feasible to provide thoroughly commercially practicable fasteners without any pilot at all. Accordingly, reference hereinafter to the rolling operation will be directed to the formation of the threads or ribs without reference to either the head of the fastener or the pilot. It has been my practice from the time of my invention of Patent No. 1,482,151 to produce large quantities of the fasteners by automatically-fed thread rolling machines, and one of the advantages of the present invention is the fact that an interlock is provided intermediate the ends of the threaded or ribbed portion of the fastener, and such interlock can be and is produced by me by a thread rolling operation without the expense or difficulties incident to rolling the form of fastener shown in my Patent No. 1,545,471, as explained in my co-pending application Serial No. 651,783. To produce the fastener of the present invention, whether of any of the embodiments shown in the drawings or other equivalent embodiments, it is only necessary to provide, instead of a single die, one die for each thread series or sections, and by adjusting one of the dies with respect to the other where only two thread series are employed, as in Figure 1, or by adjusting the intermediate die where three thread series are employed, as in Figure 5, or by adjusting each alternate die where more than three thread series are employed, the thread or rib forming grooves of the dies can be caused to be offset with respect to each other so as to possess the same relative location as the desired location of the ribs or threads to be formed. The several dies are then fastened together, as by being riveted together, and the whole is inserted into the automatic rolling machine as a single die, and the rolling operation is carried out after the manner of standard practice, except that each alternate die is forming ribs or threads offset angularly with respect to the ribs or threads in the single adjacent series or the two adjacent series. There is no need or occasion for rolling in and out parts of a rib, or otherwise providing for the formation of interruptions in the length of a rib. The process consists merely in forming up the material of the body of the fastener into a series of ribs at one place in certain definite spacing and forming up a series of similar ribs at an adjacent place with corresponding spacing but adjusted angularly so that the ribs of the second series do not register with the ribs of the first but instead register with the valleys between the ribs of the first.

Since the specific method of producing the fasteners forms no part of the product invention and is not claimed herein, the foregoing general statement is sufficient to enable an understanding of the manner in which these products are produced as distinguished from those of my prior Patent No. 1,545,471.

What is claimed is:—

1. A fastener comprising a pin-like body having a series of ribs extending for a section of the body, and a second series of ribs likewise extending for another section of the body, the ribs of the second series being located to have their outer ends terminate substantially in line with the valleys between the ribs of the first section, all of the ribs being substantially uniform in geometric contour and proportions and being spaced about the body of the fastener such that the spacing between any two ribs is substantially equal to the width of the base of a rib, and the outer ends of the ribs of the second series being in substantially the same transverse plane of the fastener as the inner ends of the first series.

2. A hammer-driven fastener comprising a pin-like body having a plurality of series of ribs, each series extending for a section of the body different from the section along which the other series extends, the ribs of one series being set angularly about the body out of alinement with but otherwise continuous of the ribs of the other series, and the ribs being pitched to cause them to form threads and the pitch being such that when the fastener is driven into an opening in work of a diameter less than the greatest distance between outstanding edges of diametrically-opposite threads the fastener will be rotated incident to its axial advance and the engagement of the threads with the work.

3. A fastener comprising a pin-like body having a plurality of series of outstanding material-displacing ribs extending along the body, the ribs of one series being spaced along the body beyond the ribs of the other series, and the ribs of one series being located angularly about the body out of line with the ribs of the other series and so located and proportioned as to lie on the body in such position that extended lines of the ribs of one series would be parallel to the ribs of the other series, the ribs of one series being constructed and arranged to displace the material into which the fastener is introduced laterally into the path of the ribs of the preceding series so as to overhang and interlock with the ends of said last-mentioned ribs.

4. A fastener as claimed in claim 3 wherein the outer ends of the inner series of ribs lie in substantially the same transverse plane of the pin body as that occupied by the inner ends of the outer series.

5. A fastener as claimed in claim 3 wherein each of the ribs has a thread pitch and the pitch is sufficiently high to enable impact driving of the fastener into work engaged by the ribs to cause the ribs to move the fastener angularly as it advances axially under impact.

HEYMAN ROSENBERG.